L. M. Guiteau,
Horseshoe.
N° 47,635.     Patented May 9, 1865.

Witnesses:
M. Ahearn Jr.
Theo Tusch

Inventor:
L. M. Guiteau
per Munn & Co
Attorneys

UNITED STATES PATENT OFFICE.

LORING M. GUITEAU, OF BATAVIA, NEW YORK.

IMPROVEMENT IN HORSESHOES.

Specification forming part of Letters Patent No. 47,635, dated May 9, 1865.

*To all whom it may concern:*

Be it known that I, LORING M. GUITEAU, of Batavia, in the county of Genesee and State of New York, have invented a new and Improved Horseshoe; and I do hereby declare that the following is a full, clear, and exact description thereof, which will enable others skilled in the art to make and use the same, reference being had to the accompanying drawings, forming part of this specification, in which—

Figure 1:
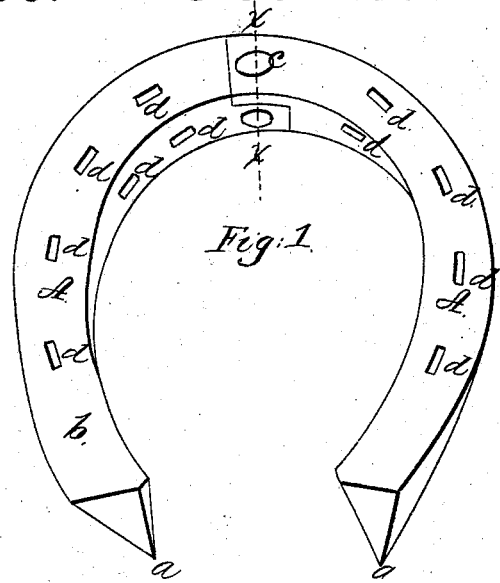
Figure 2:
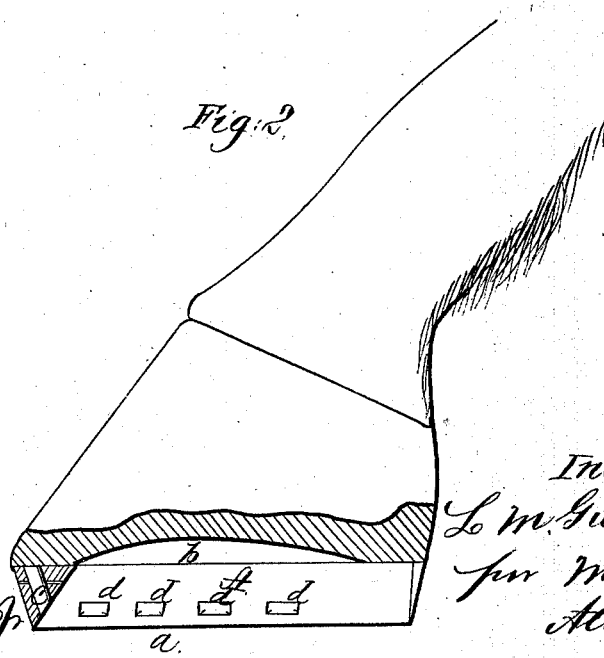

Figure 1 is a plan or top view of my invention; Fig. 2, a side sectional view of the same applied to the hoof of a horse, taken in the line $xx$, Fig. 1.

Similar letters of reference indicate like parts.

This invention consists in constructing a horseshoe of V form in its transverse section, so that a sharp edge will be formed all around the bottom of the shoe in order to prevent slipping, and to avoid the use of calks, and having the shoe composed of two equal parts connected at their front ends by a joint, which is at the center of the front part of the hoof, in order to admit of the shoe expanding under the growth of the hoof, the shoe being formed with oblique holes, through which the nails pass from the inner side of the shoe into the hoof, the heads of the nails being above the sharp bottom of the shoe. By this invention the hoof is allowed to expand freely under growth, and the shoe allowed to remain on the hoof until worn out, thereby avoiding the trouble and expense of detaching and resetting shoes and the injury done to the hoof by the frequent withdrawal from and the driving therein of nails.

The shoe is composed of two equal parts, A, which are curved to correspond each to a longitudinal half of the bottom of the hoof at its edge. These parts A A are of V form in their transverse section, and the bottom of the shoe is consequently a sharp edge, $a$, the latter extending all around the shoe, with a broad side, $b$, at its upper surface, to constitute a good bearing for the hoof. (See Fig. 2.) The two parts A A at their front ends are halved together and connected by a pivot, $c$, which forms a hinge or joint, the latter being at the center of the front part of the hoof, and each part A has a series of holes, $d$, made obliquely through it, said holes extending from the inner sides of the parts A a short distance above their lower sharp edge, $a$, to the center of the upper surfaces, $b$. The shoe is secured to the hoof by nails driven through these holes into the hoof, the direction of the holes giving a proper direction to the nails as they pass into hoof, so that there will be no danger of the horse being pricked by any improper driving of the nails, while at the same time the heads of the nails, in consequence of being above the edge $a$ of the shoe, will be protected from wear, and consequently capable of being readily withdrawn at any time. The joint at the front of the shoe admits of the parts A A expanding under the growth of the hoof, so that the horse will not be injured by a contraction of the former—a contingency which now frequently occurs in consequence of the ordinary shoes being rigid and not having them detached, expanded, and reset as frequently as they should be; but when this difficulty is not allowed to occur the hoof of the horse is much injured by the preventative caused by the frequent withdrawal from and the driving of nails into the same. My improvement does not require the shoe to be detached for this purpose, as it expands or widens under the growth of the hoof, and consequently may remain attached to the hoof until worn out. The sharp bottom edge of the shoe obviates the necessity of calks by effectually preventing slipping; and if the shoe be made of good steel, properly tempered, the edge will last a long time, as it extends all around the shoe and forms a good bearing-surface.

I claim as new and desire to secure by Letters Patent—

1. A horseshoe constructed of V form in its transverse section, substantially as described.

2. Constructing the shoe of two parts, A A, of V form in their transverse section, and connected by a pivot or joint to admit of the expansion of the shoe under the growth of the hoof, as set forth.

3. The oblique nail-holes $d$, in combination with the transverse V form of the shoe, and the two parts thereof connected by a pivot or joint, substantially as specified.

LORING M. GUITEAU.

Witnesses:
M. W. HEWITT,
H. D. GIBBS.